(12) United States Patent
Biswas et al.

(10) Patent No.: US 10,051,663 B2
(45) Date of Patent: Aug. 14, 2018

(54) METHOD AND DEVICE FOR TRANSMITTING DATA USING INTER-PULSE INTERVAL MODULATION TECHNIQUE

(71) Applicant: Board of Trustees of Michigan State University, East Lansing, MI (US)

(72) Inventors: Subir K. Biswas, Okemos, MI (US); Dezhi Feng, East Lansing, MI (US); Faezeh Hajiaghajani Memar, East Lansing, MI (US); Saptarshi Das, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 78 days.

(21) Appl. No.: 15/377,195

(22) Filed: Dec. 13, 2016

(65) Prior Publication Data

US 2017/0171889 A1    Jun. 15, 2017

Related U.S. Application Data

(60) Provisional application No. 62/267,036, filed on Dec. 14, 2015.

(51) Int. Cl.
| | |
|---|---|
| *H04W 74/08* | (2009.01) |
| *H04W 4/00* | (2018.01) |
| *H04W 4/80* | (2018.01) |
| *H04W 84/12* | (2009.01) |
| *H04W 84/18* | (2009.01) |
| *H04W 52/02* | (2009.01) |

(52) U.S. Cl.
CPC ....... *H04W 74/0816* (2013.01); *H04W 4/008* (2013.01); *H04W 4/80* (2018.02); *H04W 52/0225* (2013.01); *H04W 52/0235* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,659,299 A | 8/1997 | Williamson et al. | |
| 5,691,723 A | 11/1997 | King et al. | |
| 6,212,230 B1 | 4/2001 | Rybicki et al. | |
| 8,891,355 B1 | 11/2014 | Huttle | |
| 9,655,144 B2 * | 5/2017 | Seok | H04W 74/04 |
| 9,769,758 B2 * | 9/2017 | Kim | H04W 74/06 |

(Continued)

FOREIGN PATENT DOCUMENTS

CN  102098062 A  6/2011

*Primary Examiner* — Candal Elpenord
(74) *Attorney, Agent, or Firm* — Harness Dickey & Pierce, P.L.C.

(57) ABSTRACT

A method and device for transmitting data between wireless devices includes: generating and transmitting, by a first device, a data cluster signal having a signal identifier, a completion marker, and at least one silence interval provided between the signal identifier and the completion marker; receiving, by a second device, the data cluster signal; identifying, by the second device, a signal type and a transmission completion of the signal received; and decoding, by the second device, the silence interval into the data based on the signal type and a duration of the silence interval.

9 Claims, 10 Drawing Sheets

(56) References Cited

U.S. PATENT DOCUMENTS

| | | | |
|---|---|---|---|
| 2007/0037548 A1* | 2/2007 | Sammour | H04W 52/0235 |
| | | | 455/343.2 |
| 2007/0123282 A1 | 5/2007 | Levinson | |
| 2007/0140303 A1* | 6/2007 | Kim | B61L 27/0088 |
| | | | 370/503 |
| 2010/0245173 A1* | 9/2010 | Honda | H04Q 9/00 |
| | | | 342/367 |
| 2011/0140851 A1* | 6/2011 | Lee | H04W 52/0235 |
| | | | 340/9.1 |
| 2013/0128786 A1* | 5/2013 | Sultan | H04W 52/0238 |
| | | | 370/311 |
| 2013/0155957 A1 | 6/2013 | Shin et al. | |
| 2017/0208547 A1* | 7/2017 | Choi | H04W 4/70 |

\* cited by examiner

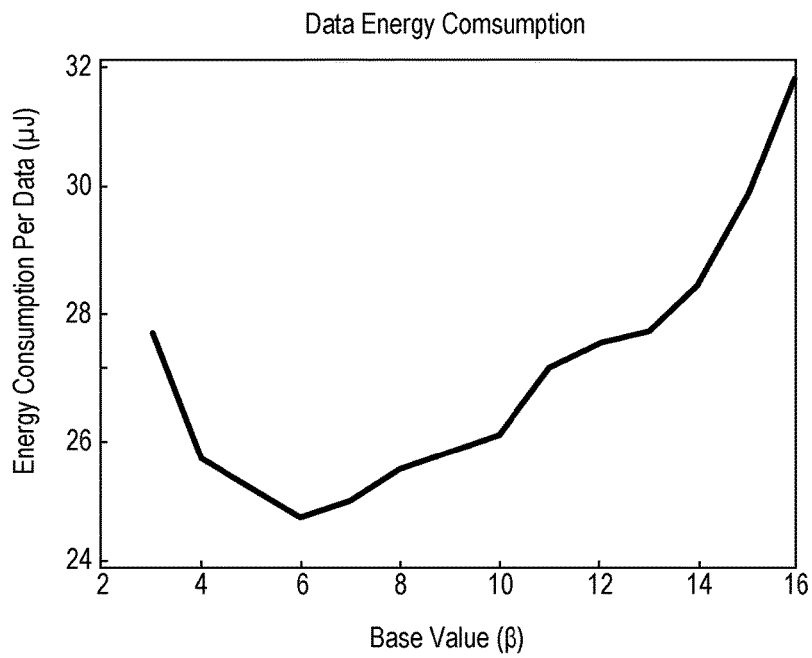

FIG. 9

|  | δ=63 | δ=127 | δ=255 | δ=511 | δ=1023 | δ=2047 |
|---|---|---|---|---|---|---|
| Rene Mote | $\beta_{opt}=5$ | $\beta_{opt}=6$ | $\beta_{opt}=6$ | $\beta_{opt}=6$ | $\beta_{opt}=5$ | $\beta_{opt}=6$ |
| Mica Mote | $\beta_{opt}=7$ | $\beta_{opt}=6$ | $\beta_{opt}=6$ | $\beta_{opt}=6$ | $\beta_{opt}=6$ | $\beta_{opt}=6$ |
| EYES Mote | $\beta_{opt}=7$ | $\beta_{opt}=6$ | $\beta_{opt}=6$ | $\beta_{opt}=6$ | $\beta_{opt}=6$ | $\beta_{opt}=6$ |
| μA MPS Mote | $\beta_{opt}=7$ | $\beta_{opt}=6$ | $\beta_{opt}=6$ | $\beta_{opt}=7$ | $\beta_{opt}=6$ | $\beta_{opt}=6$ |
| Mote-5 | $\beta_{opt}=10$ | $\beta_{opt}=10$ | $\beta_{opt}=7$ | $\beta_{opt}=9$ | $\beta_{opt}=9$ | $\beta_{opt}=7$ |
| Mote-6 | $\beta_{opt}=5$ | $\beta_{opt}=6$ | $\beta_{opt}=6$ | $\beta_{opt}=6$ | $\beta_{opt}=5$ | $\beta_{opt}=6$ |

FIG. 10

Signal Pattern For Multi-Access Point Communication

| Signal Type | Signal Identifier | End Marker | Data Message | Data Packet Pattern |
|---|---|---|---|---|
| SYNC | "11" | "11" | Transmitter ID; Relative Sleep Time | SYNC: 1 1 [Transmitter ID] 1 1 [Relative sleep time] 1 1 |
| RTS | "101" | "11" | Transmitter ID; Receiver ID | RTS: 1 0 1 [Transmitter ID] 1 1 [Receiver ID] 1 1 |
| CTS | "1001" | "11" | Transmitter ID | CTS: 1 0 0 1 [Transmitter ID] 1 1 |
| Cluster | "10001" | "111" | Transmitter ID; Data | Cluster: 1 0 0 0 1 [Transmitter ID] 1 1 [Data] 1 1 1 |
| EOT | "100001" | "11" | Transmitter ID | EOT: 1 0 0 0 0 1 [Transmitter ID] 1 1 |

FIG. 13

METHOD AND DEVICE FOR TRANSMITTING DATA USING INTER-PULSE INTERVAL MODULATION TECHNIQUE

CROSS-REFERENCE TO RELATED APPLICATIONS

This application claims the benefit of U.S. Provisional Application No. 62/267,036, filed on Dec. 14, 2015. The entire disclosure of the above application is incorporated herein by reference.

GOVERNMENT RIGHTS

This invention was made with government support under NSF CNS 1405273 awarded by the National Science Foundation. The government has certain rights in the invention.

FIELD

The present disclosure relates to data transmission in wireless sensor networks using inter-pulse interval modulation.

BACKGROUND

A wireless sensor network (WSN) is an example of a network in which multiple devices (i.e., nodes) communicate with each other using a specific communication protocol. Among the communication protocols for WSNs, medium access control (MAC) is a technique that enables nodes to operate in a shared-medium network. For any MAC protocol design, there are three operational parameters that are taken into consideration: (1) collision avoidance with other nodes transmitting simultaneously on the same medium, (2) prevention of overhearing of signals at neighbor nodes that are not the intended target of a signal, and (3) efficient utilization of energy. There are a variety of protocols that have been developed for data communication networks, such as time-division multiple access (TDMA), code-division multiple access (CDMA), and contention-based protocols like IEEE 802.11. The third parameter (i.e., efficient energy utilization) becomes important in the context of WSNs because the devices are typically small, powered by tiny batteries, and not amenable for regular maintenance. Therefore, it is desirable to find an energy efficient data representation and communication protocol.

MAC protocol design for wireless sensor networks is a broad research area and can be divided into TDMA-based protocols, contention-based protocols, and hybrid protocols. Pulse-based methods are also used in protocol design of WSNs and other applications to achieve energy efficiency, security, and cooperation between heterogeneous wireless devices.

In TDMA-based protocols, a duty cycle is built in to preserve energy and such protocols typically do not suffer from collision. However, TDMA-based protocols are not widely accepted due to their high complexity and overhead due to non-trivial problems of synchronization. Furthermore, TDMA-based protocols may not support node-change scalability and it is difficult to manage inter-cluster communication.

Among contention-based protocols, S-MAC is a well-known protocol that uses a fixed listen/sleep cycle to conserve energy. S-MAC significantly reduces energy consumption by periodically putting nodes into sleeping mode. Another contention-based protocol that is based on S-MAC is a T-MAC protocol in which the fixed listen/sleep cycle of S-MAC is provided as adaptive sleep/active duty cycle for radio operation. There have also been other protocols proposed in recent decades which are based on this listen/sleep cycle, like ADV-MAC and R-MAC. Some hybrid protocols, like Z-MAC, have the properties of both TDMA and Carrier Sense Multiple Access (CSMA). The protocols are based on traditional packet transmission, which suffers from the overhead of large numbers of bits within a data packet, header, and preambles. The transmission of such overheads can be prohibitively energy-inefficient.

Pulse communication has been applied in the research of WSNs for several years, due to the pulse modulation advantage on energy saving during transmission. A power-efficient communication model, which uses pulse and silence, is proposed for computing a function of data in a wireless sensor network. However, the pulse communication is restricted to communication between sensor nodes and base stations (satellites), and does not involve transmission of information between neighbor sensor nodes.

Data encoding based on pulse width and pulse position also has broad applications in engineering. TDMA-like pulse encoding principles increase data transmission rates based on commercial grade LEDs and LRDs. Other pulse encoding methods based on pulse position modulation have also been developed to target the error correction or bit distinguishing. However, the basic data expression is still binary and pays for the overheads of headers and preambles within the traditional packet transmission. Although the above MAC protocols can improve the idling energy expenditure in low duty-cycle networks, they still use traditional binary encoding principles and suffer from packet overheads.

SUMMARY

This section provides a general summary of the disclosure, and is not a comprehensive disclosure of its full scope or all of its features.

The present disclosure is directed toward a method and device for transmitting data between wireless devices having a transceiver and communicating by way of a wireless network. In another aspect, a method includes: generating and transmitting, by a first wireless device, a data cluster signal having a signal identifier, a completion marker, and at least one silence interval provided between the signal identifier and the completion marker; receiving, by a second wireless device, the data cluster signal; identifying, by the second wireless device, a signal type of the signal received based on the signal identifier and a transmission completion of the signal received based on the completion marker; decoding, by the second wireless device, the silence interval into the data based on the signal type and a duration of the silence interval; and transmitting, by the second wireless device, an end of transmission signal to the first wireless device in response to identifying the signal received as the data cluster signal and the transmission completion of the data cluster signal.

In an aspect of the present disclosure, a signal identifier identifies a signal type of a data cluster signal, a silence interval is indicative of data, and a completion marker indicates an end of the data cluster signal. A further aspect provides an end of a transmission signal including a signal identifier associated with the end of transmission signal. In yet another aspect, a signal identifier of an end of a transmission signal may be different from a signal identifier of a data cluster signal.

This section provides background information related to the present disclosure which is not necessarily prior art. Further areas of applicability will become apparent from the description provided herein.

DRAWINGS

The drawings described herein are for illustrative purposes only of selected embodiments and not all possible implementations, and are not intended to limit the scope of the present disclosure.

FIG. 9 is a graph that illustrates energy consumption per data with PPCP form for different values of the base for digit separation;

FIG. 10 is a table that provides optimal base values for digit separation in different motes and for various maximum data values;

FIG. 13 is a diagrammatic view illustrating an example of signal patterns for a multi-access point PPCP protocol;

Corresponding reference numerals indicate corresponding parts throughout the several views of the drawings.

DETAILED DESCRIPTION

In traditional network transmission protocols, data packets are used as the most common protocol data unit where data is formatted into discrete chunks, called packets, which encode information in terms of bits along with associated control information. Thus, data transmission with a conventional data packet can be energy-inefficient due to the communication, processing, and buffering overheads of large numbers of bits within the packet's header and preambles.

A communication controller of the present disclosure utilizes an encoding scheme described herein that uses a silence interval between two pulses to encode any data. By using a silence interval in lieu of a series of pulses for conveying data values, the number of pulses transmitted is reduced and, therefore, the amount of energy used to transmit/receive data is less than that of conventional protocols.

Figure 1:
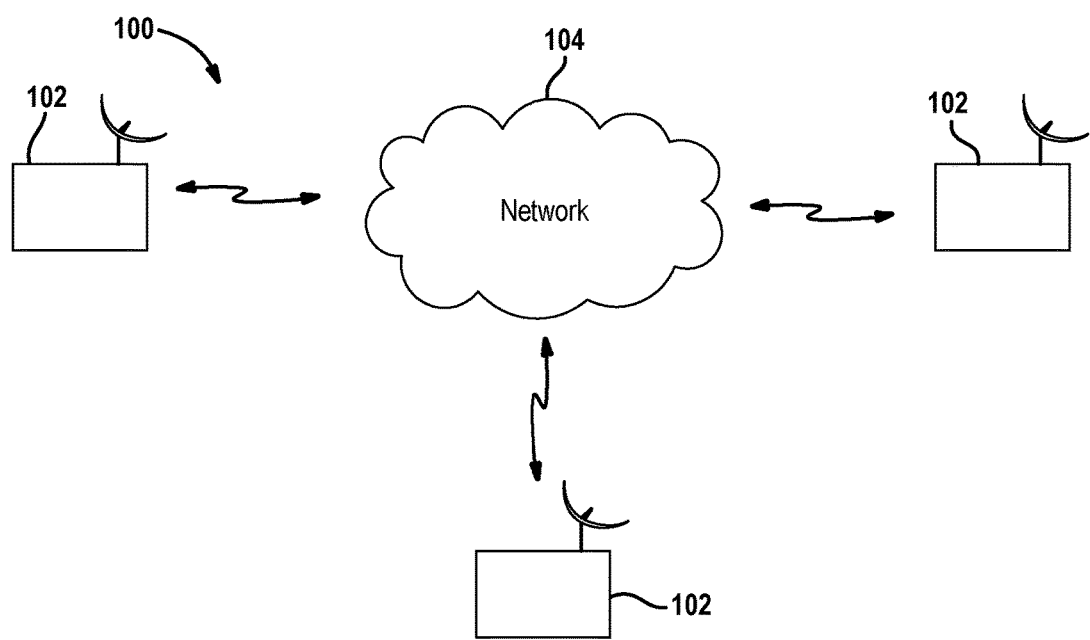
FIG. 1 is a diagrammatic view illustrating a wireless sensor network having multiple sensor devices in communication with each other.
Figure 2:
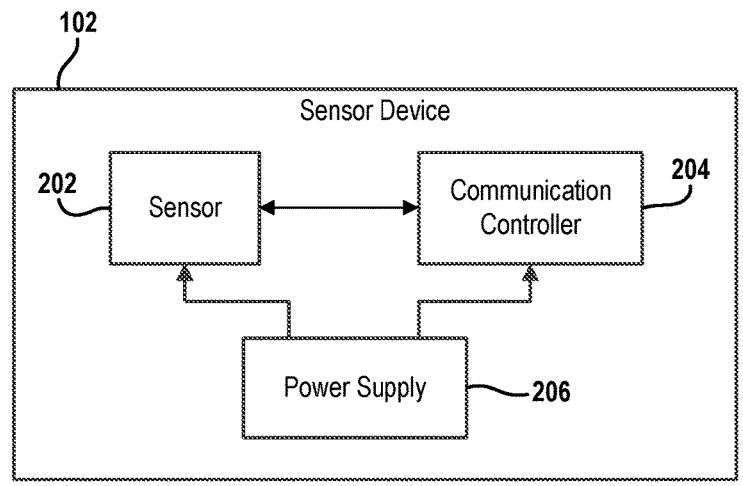
FIG. 2 is a functional block diagram of a sensor device.

The present disclosure will now be described more fully with reference to the accompanying drawings. With reference to FIGS. 1 and 2, a wireless sensor network (WSN) 100 includes multiple sensor devices 102 that communicate via a wireless network 104, such as Wi-Fi, Bluetooth, ZigBee, RF communication, or other suitable short/long range communication.

Each sensor device 102 includes a sensor 202, a communication controller 204, and a power supply 206. The power supply 206 supplies power to the communication controller 204 and the sensor 202, and may be a battery and/or other suitable power source. The sensor 202 monitors an environmental parameter and outputs data corresponding to the environment parameter. As an example, the sensor 202 is preferably a temperature sensor that outputs a temperature of the location at which the sensor device 102 is disposed. The sensor 202 may alternately be an accelerometer that outputs acceleration of the sensor device along one or more axes. Other sensors may be used as part the sensor device and should not be limited to the examples provided herein.

The communication controller 204 transmits data to other devices within the WSN 100. Accordingly, in the present disclosure, a sensor device is also referred to as a node. A sensor device that transmits a signal is preferably referred to as a transmitter node, and a sensor device that receives the signal is preferably referred to as a receiver node.

Figure 3:
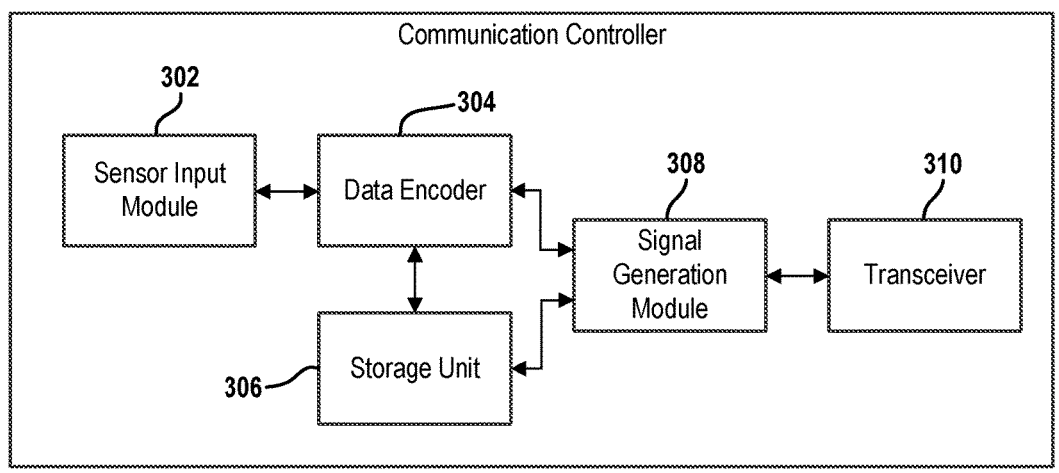
FIG. 3 is a functional block diagram of a communication controller for the sensor device.

With reference to FIG. 3, the communication controller 204 includes a sensor input module 302, a data encoder 304, a storage unit 306, a signal generation module 308, and a transceiver 310. As described further below, the communication controller 204 is a computer that includes, at least, a processor and a memory circuit that is a non-transitory computer-readable medium. The communication controller 204 may store one or more processes and/or algorithms that are executed by the processor to have the communication controller 204 operate as the sensor input module (i.e., a sensor input) 302, the data encoder 304, and the signal generation module (i.e., a signal generator) 308.

The sensor input module 302 receives data to be transmitted from the sensor 202. The sensor input module 302 provides the data to the data encoder 304 as the sensor input module 302 receives the data. Alternatively, the sensor input module 302 holds the data until it is requested by the data encoder 304 or, alternatively, may transmit the data periodically to the data encoder 304.

The data encoder 304 encodes the data as a silence interval that is transmitted between pulses or, more particularly, markers, as described in detail below. The silence interval is referred to as an inter-pulse silence.

Once the data encoder 304 determines the silence interval indicative of the data, the signal generation module 308 constructs a data cluster and transmits the signal indicative of the data cluster via the transceiver 310. As an example, if the WSN 100 includes only two sensor devices 102 that communicate via a dedicated channel, the signal generation module 308 forms the data cluster as the silence interval between a start marker and an end marker, and transmits the data cluster via the transceiver 310 as a data cluster signal. If the WSN 100 includes two or more sensor devices that communicate via a shared channel, the signal generation module 308 transmits multiple signals as part of a multi-access point protocol, which is described further below, to transmit the data to an intended sensor device. The protocol and markers used by the signal generation module 308 may be stored in the storage unit 306.

The data encoder 304 utilizes an encoding scheme in which fewer pulses (or bits) are used to represent data values. Specifically, the communication controller employs a pulse position coded protocol data unit (PPCP) in which a silence interval between a start marker and an end marker is indicative of the data value being transmitted.

Figure 4A:
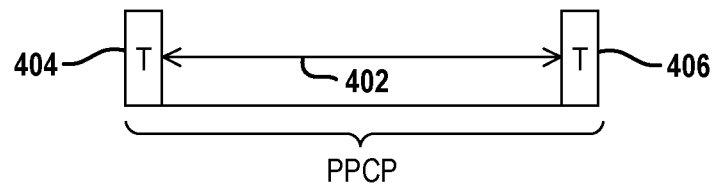
FIGS. 4A and 4B are diagrammatic views illustrating examples of a pulse position coded PDU (PPCP) form.

With reference to FIG. 4A, under the PPCP form, a data value (δ) is expressed in terms of a positive integer (δ>0). The data value is transmitted as a silence interval 402 between a start marker 404 and an end marker 406. The start marker 404 is used to indicate the start of the silence interval and is placed before a silence interval. Similarly, the end marker 406 is used to indicate the end of the silence interval 402 and is placed after the silence interval 402. For example, in FIG. 4A, the start and end makers 404 and 406 are provided as a pair of pulses having a duration represented by "T." The silence interval 406 is indicative of the data value being transmitted. In the example of FIG. 4A, the length of the silence interval is determined using equation 1, where K is a positive integer that is based on the requirements of the application (e.g., accepted delay and power harvesting requirements). A large "K" means a longer silence interval for a given value (i.e., more time between successive pulse transmissions). This implies a lesser rate of energy usage and, therefore, more time for energy replenishment (by harvesting, etc.)

$$(\delta+1)K*T \quad \text{Equation 1}$$

A receiver node that receives the data packet having the PPCP form decodes the data packet by identifying the start and end markers 404 and 406 and determining the duration of the silence interval 402. The duration of the silence interval 402 is converted to a data value using equation 1.

Figure 4B:
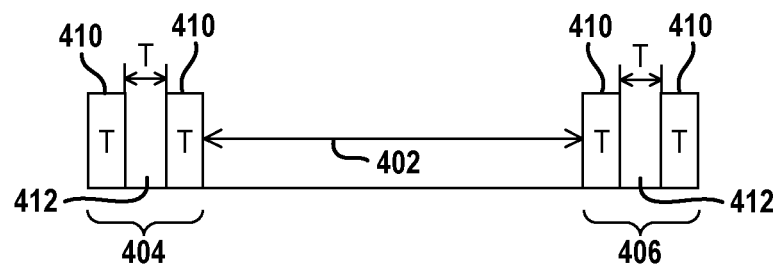

In the example of FIG. 4A, the start and end markers 404 and 406 are provided as a single pulse. Alternatively, as shown in FIG. 4B, the start and end markers 404 and 406 are both provided with a pair of pulses 410 separated by a silence period 412, which is illustrated as one pulse duration (T). As discussed further below, the silence period 412 between the pair of pulses 410 is used to identify transmission of different types of data messages. The start and end markers are configured in various suitable ways for identifying the start and end of the signal, and should not be limited to the examples provided herein. For example, the start and end markers do not have to be of same length or format, and can be designed based on considerations including energy overhead and error-resilience in the presence of pulse losses and false positive detection.

While reducing the energy required to transmit a data value, PPCP may increase the time of the signal transmission. For example, the maximum transmission delay of a traditional binary packet for each data is $\rho+\log_2 \delta$ times bit duration, where $\rho$ is the number bits required for the preamble. Since the pulse coding method of PPCP may also be applied to traditional bit transmission, if bit "1" is used to code data instead of a pulse, the average transmission delay for PPCP is about $$\frac{\delta}{2}K+6$$

bit durations. The transmission delay for each PPCP is much greater than that in traditional binary packet format $$\left(\text{i.e., } \frac{\delta}{2}K+6 \geq \rho + \log_2 \delta\right).$$

In order to reduce the transmission delay of the PPCP while maintaining its advantage of low energy consumption, the data encoder 304 may employ an interleaving encoding process and a flexible base digit separation (FBDS) encoding process.

Interleaving is based on the properties of PPCP to transmit at least two data values by transmitting a second data value within the transmission period of the first data value. As indicated above, the PPCP form may consist of three components: a start marker, a silence interval (i.e., data), and an end marker. A general structure of the PPCP form is provided as:

$$\text{"1 } \underbrace{\overline{00 \ldots 00}}_{N\,number\,of\,0} \text{ 1 {Data} 1 } \underbrace{\overline{00 \ldots 00}}_{N\,number\,of\,0} \text{ 1"}$$

with N≥1. Without the interleaving encoding process, two data values are encoded using the PPCP form and are transmitted such that the PPCP form for the first data value is transmitted fully and is followed by the PPCP form of the second data value. Using interleaving, each data value is transmitted using the PPCP form with the start marker of the second data value inserted within the silence interval of the first data value.

The start marker and the end marker are provided as:

$$(1 \underbrace{\overline{00 \ldots 00}}_{N\,number\,of\,0} 1),$$

where "1" has a pulse duration of T and "0" indicates a silence duration of T. The start marker and the end marker may include two pulses (1's) separated by a finite number of zeros (N, where N is an integer), where N can be varied in order to distinguish interleaved PPCPs. It is to be noted that, with interleaving encoding, the pattern of the end marker should be the same as the pattern of the corresponding start marker inside the PPCP. For example, the start and end markers for the first data value are the same, but are different from the start and end markers of other data values interleaved with the first data value.

The available maximum size of PPCP cluster is defined as $C_{max}$, and is determined by the following equation where the degree of interleaving (DIL) is a positive integer (e.g., DIL≥2) and $\chi$ is the total number of pulses for the PPCP (e.g., $\chi=4$, two pulses for a start marker and two pulses for an end marker):

$$C_{max} = \frac{DIL}{2}*[(\delta+1)K+\chi] \quad \text{Equation 2}$$

In the following, a carrier PPCP is a PPCP that contains a start marker for another PPCP. Accordingly, the other PPCP is referred to as an interleaved PPCP inside of the carrier PPCP. The interleaving encoding process is described as follows:

A. Encoding the first (carrier) PPCP which will encompass interleaved PPCPs: The first (carrier) PPCP (i=1) is encoded as "101{Data$_1$}101" with $N_1$=1. Every start marker that is in-use in the interleaved cluster is saved even though the PPCP has not ended with a respective end marker. For example, N=1 is already in use and the start marker "101" is stored while the PPCP starting and ending with 101 is not delivered.

B. Choosing the start and end markers for an interleaved PPCP: For each interleaved PPCP i (i≥2) which is to be encapsulated inside the previously carrier ones, construct $$\text{``}1\ \underbrace{00\ \ldots\ 00}_{i\ number\ of\ 0}\ 1\ \{Data_i\}\ 1\ \underbrace{00\ \ldots\ 00}_{i\ number\ of\ 0}\ 1\text{''}$$

with the smallest available N which is not used for any carrier $N_k$'s (k∈PPCPs encompassing PPCP i) to avoid similar start/end markers for multiple interleaved PPCPs. For example, if two PPCPs Y and Z carry an interleaved start marker for PPCP X and $N_y$=1 and $N_z$=3, then $N_x$=2. Thus, start/end marker for PPCP X would be "1001". If the start/end markers are set as "101" or "10001", it will have a similar pattern to the start/end markers of the previous carrier PPCPs.

C. Encapsulating interleaved PPCPs inside carrier PPCPs:
  (I) Previously interleaved (also carrier) PPCPs contain either the start and end markers along with the whole data value of an $i^{th}$ PPCP or the start marker of it and a portion of the data. In the latter case, the $i^{th}$ PPCP's end marker comes after the end marker of the last PPCP among the carriers of i (the previous i-1 PPCP). This depends on the relative size available for encapsulating and the size of $i^{th}$ PPCP, and can be determined using the following procedure.
    i. Consider that the start marker of the $i^{th}$ PPCP resides at the first available silence duration after the start marker of i-1 PPCP (k being the number of carrier PPCPs started before i). Check if a collision occurs:
      1. between the start marker of the $i^{th}$ PPCP and the end marker of all k carrier PPCPs, or
      2. between the end marker of the $i^{th}$ PPCP and the end marker of all k carrier PPCPs.
    ii. If any of the collision situations mentioned occurs, go to (II). If a collision does not occur, go to (III).
  (II) Following an unsuccessful attempt for accommodating space for the new interleaved PPCP, in this step, another setting for encapsulating the $i^{th}$ PPCP inside previously interleaved PPCPs is analyzed by moving the start marker of the $i^{th}$ PPCP forward from the previous location in the silence duration between start and end markers of carrier PPCPs (the interleaved cluster). Thus, the start marker of the $i^{th}$ PPCP is moved one pulse duration forward. In this step, depending on the position of the $i^{th}$ PPCP among the interleaved cluster, step B is re-run to check if the start marker of the $i^{th}$ PPCP should be changed (go to step I).
  (III) After the location of the start marker of the interleaved PPCP inside the carrier one(s) is found from steps (I and II), check if the size of the whole cluster exceeds the maximum interleaved cluster size. If yes, exclude the $i^{th}$ PPCP from the interleaved cluster, abort the interleaving module and send the interleaved cluster without $i^{th}$ PPCP. If not, go to (IV).
  (IV) Check the queue for any available value to be interleaved. If there is one available, go to B. Otherwise, exit the interleaving module and send the interleaved cluster.

Figure 5:
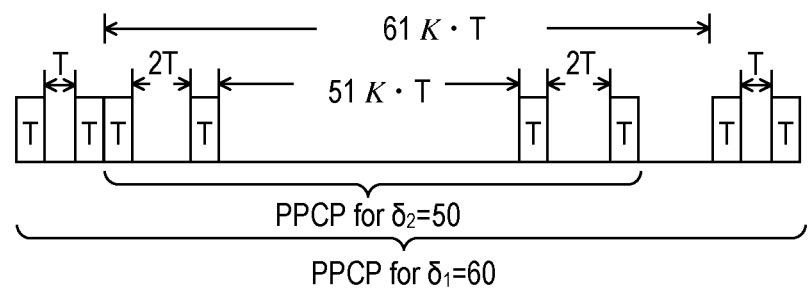
FIG. 5 is a diagrammatic view illustrating an example of an interleaving format for two data values $\delta_1$ and $\delta_2$.

By taking advantage of the interleaving encoding process, the communication controller 204 of the present disclosure reduces the transmission delay associated with the PPCP form. As an example, FIG. 5 illustrates the transmission of two data values, $\delta_1$=60 and $\delta_2$=50, in which the second data value is transmitted within the first data value. The start and end markers for the first data value are provided as "101," and the start and end markers for the second data value are provided as "1001." The number of the silence duration or, in other words, the number of "0s" is based on the data value being transmitted. In particular, for the first data value, one "0" is positioned between the pulses and, for the second data value, two "0s" are positioned between the pulses.

Each data value is encoded as an inter-pulse silence (i.e., silence interval) having a duration determined by equation 1. Thus, the inter-pulse silence for $\delta_1$=60 is equal to 61K*T and the inter-pulse silence for $\delta_2$=50 is 51K*T. If the interleaving encoding process is not implemented, the total transmission delay for the two PPCPs is ((61+51)K)+12)*T=(112K+12)T, where 12 is the total duration for transmitting the start and end markers for the two PPCPs. After implementing the interleaving principle, however, the total transmission delay of these two PPCPs is (61K+6)T, where "6" is the duration for transmitting the start and end markers for the first data value. Therefore, the delivery delay is significantly reduced by proper interleaving.

Figure 6:
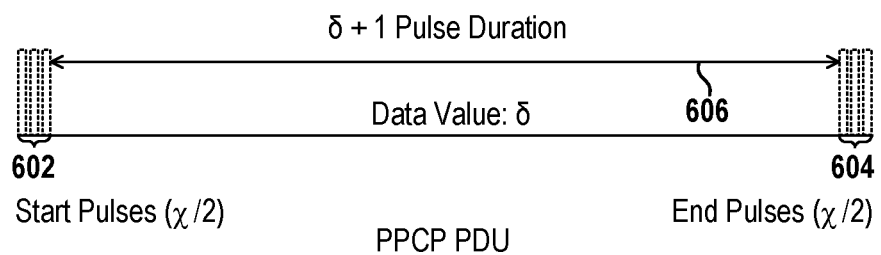
FIG. 6 is a diagrammatic view illustrating an example of a PPCP form in which the pulse duration is $\delta+1$.

In addition to the interleaving encoding process, the data encoder 304 may also utilize the FBDS encoding process to decrease the length of the PPCP-based signal. For the FBDS encoding process, the data encoder 304 represents the data value provided by the sensor 202 as a multi-digit number in a number system of a predefined base (i.e., β value). As an example, FIG. 6 represents an example implementation of a PPCP coding having a start marker 602, an end marker 604, and a silence period 606. In the example, the start marker 602 and the end marker 604 are provided as χ/2 pulses, and the silence period, which is indicative of the data value δ, has a duration of δ+1. The transmission duration is χ+δ+1 pulse durations, resulting in an effective transmission rate of C/(χ+δ+1) data values per second, where C is capacity (bits/sec) of the carrier PPCP.

Figure 7:
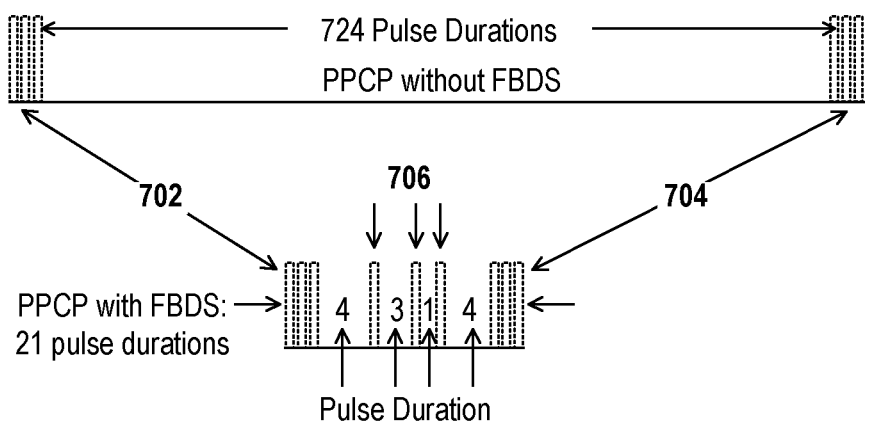
FIG. 7 is a diagrammatic view illustrating an example of flexible base digit separation (FBDS) for data value $\delta=723$, with base value $\beta=6$.

FBDS, as a silence compression mechanism, is introduced for mitigating intra-PDU idle listening and long PPCP transmission times for large data values. With FBDS compression, a data value δ is represented as a multi-digit number in a number system of base β. The resulting digits are separately sent using the PPCP format. For example, the data value 723 is represented in a base-6 number system as 3203. With FBDS enabled, a transmitter sends the digits "3," "2," "0," and "3" separately with a single pulse delimiter between the digits. More particularly, as shown in FIG. 7, the silence duration for data value 723 without FBDS is equal to 724 (i.e., δ+1=723+1=724). Using FBDS, the signal transmitted includes a start marker 702, an end marker 704, and four silent periods separated by single pulse delimiters 706, where the silent periods have a pulse duration of "4," "3," "1," and "4" are indicative of data values "3," "2," "0," and "3," respectively. As illustrated, FBDS significantly reduces the PDU transmission time from 730-pulse duration to 21-pulse durations.

With reference to Table 1 below, FBDS may reduce the transmission duration from χ+δ+1 to the upper bound of χ+($\log_\beta \delta$−1)+β $\log_\beta \delta$. The first term is for the start and end-pulses, the second term is for inter-digit delimiters, and the final term is the worst-case cumulative duration of all the digits. Notably, FBDS reduces the intra-PDU idling duration from $\delta$ to the worst-case of $\log_\beta \delta$. These drastic reductions from $O(\delta)$ (i.e., order of $\delta$) to worst case $O(\log_\beta \delta)$ for both transmission and intra-PDU idling are achieved with an additional transmission/reception energy cost for only $\log_\beta \delta - 1$ pulses for inter-digit delimiters. Compared to packets, PPCP with FBDS may: 1) bring significant savings in terms of Tx/Rx expenditure, 2) provide lower transmission delay and better resulting transmission rates for up to much larger data values, and 3) limit intra-PDU idling to logarithmic complexity. For a given transceiver hardware with known Tx, Rx, and idling energy budgets, the FBDS base $\beta$ should be chosen such that the difference between Tx/Rx energy savings over packets and the intra-PDU idling expenditure is maximized

TABLE 1

Performance Summary of PPCP with FBDS

| | Tx./Rx. Energy (Pulses) | Intra-PDU Rx. Idling Listening (Pulse Duration) | Tx. Duration (Pulse Duration) | Eff. Channel Capacity (values/S) |
|---|---|---|---|---|
| PPCP w/ FBDS | $\chi$ + ($\log_\beta \delta - 1$) | $\beta \log_\beta \delta$ | $\chi$ + ($\log_\beta \delta - 1$) + $\beta \log_\beta \delta$ | C/($\chi$ + ($\log_\beta \delta - 1$) + $\beta \log_\beta$ |

Figure 8:
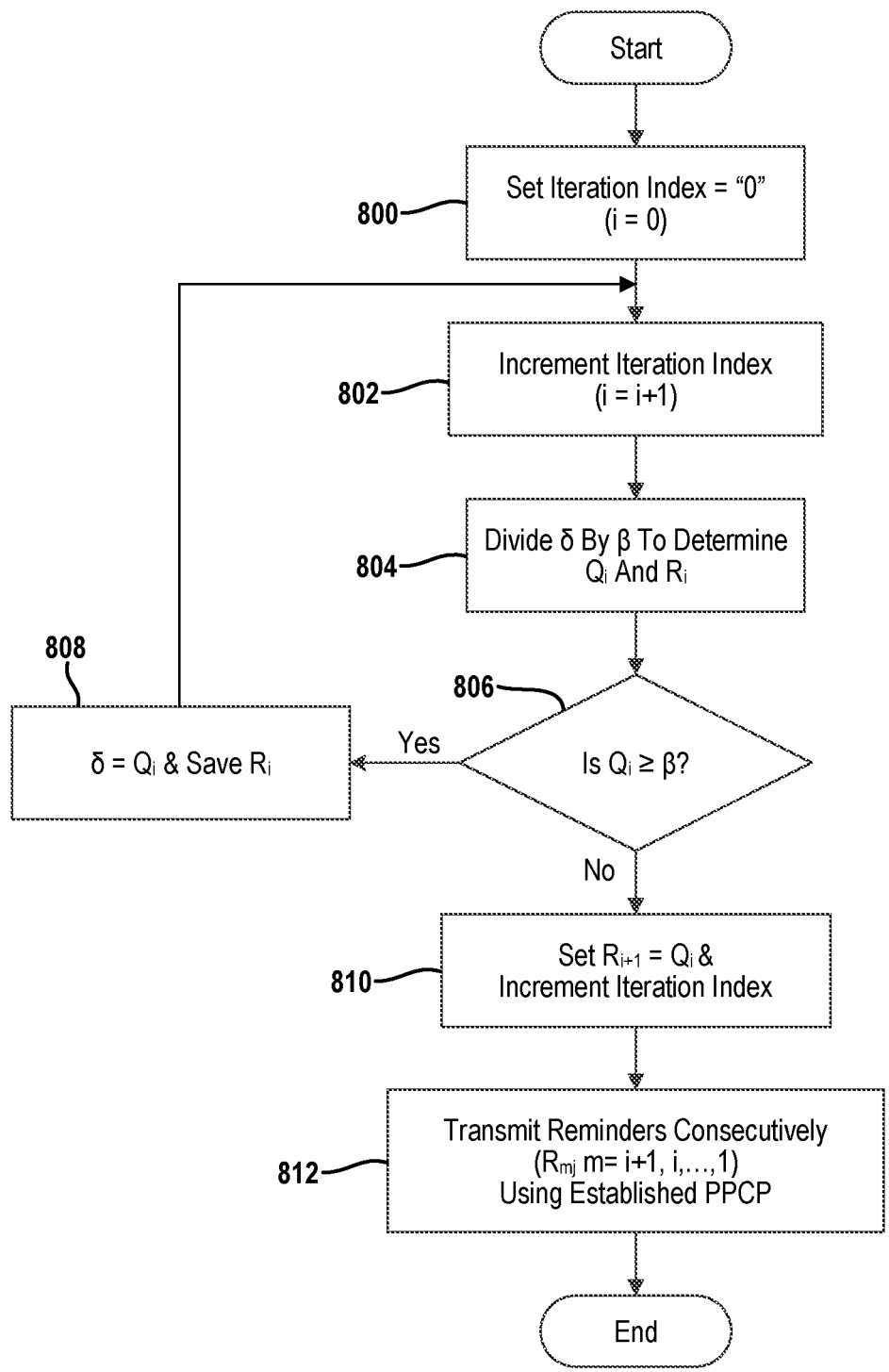
FIG. 8 is a flowchart of an FBDS encoding routine.

With reference to FIG. 8, an example of FBDS routine performed by the data encoder 304 is presented. At 800, the routine sets an iteration index (i) to 0, and increments the iteration index by 1 at 802. Using the preset base value (i.e., denominator) for the WSN 100, the data value $\delta$ is divided by the base value at 804. The quotient of the result is provided as "$Q_i$," and the remainder is provided as "$R_i$."

At 806, the routine determines whether the quotient is greater than or equal to the base value. If the quotient is greater than or equal to the base value, the routine sets the data value ($\delta$) to the quotient ($Q_i$) and saves the remainder of that iteration index ($R_i$) at 808 and returns to 802. If the quotient is not greater than or equal to the base value, then a remainder for the next iteration index (i.e., $R_i+1$) is set to the quotient (i.e., $Q_i$) and the iteration index is incremented at 810. The routine then sends each remainder consecutively using PPCP form at 812.

For a set of given system parameters, there is a specific base value in FBDS that can minimize the energy consumed by the PPCP protocol. Using the system parameters provided in Table 2, a model for selecting the optimal FBDS base value is discussed below.

TABLE 2

FBDS System Parameters

| System Parameters | Symbol | Representation |
|---|---|---|
| Traffic Variables | $\lambda$ (PDU/sec/node) | Data generation rate per node |
| | $\delta$ | Maximum data value per field |
| Network Variables | N | Number of nodes |
| | C (bps) | Channel capacity |
| PDU variables | $\rho$ (bit) | Size of preamble and start symbol for a packet |
| | $\theta$ (bit) | Payload (including F, Tx. ID, PDU Type Indicator, Sensor data) for a packet |
| | B (second) | Raw bit/pulse duration for a packet/PPCP |
| | $\beta$ | FBDS base for a PPCP |
| | T (second) | PPCP pulse slot duration |
| Energy Model Variables | $P_{Tx}^{High}$ (watt) | Power consumption for transmitting logical high $P_{Tx}^{High} = V_{Tx} * I_{Tx}^{High}$ ($I_{Tx}^{High}$: current for logical high Tx.) |
| | $P_{Tx}^{Low}$ (watt) | Power consumption for transmitting logical low $P_{Tx}^{Low} = V_{Tx} * I_{Tx}^{Low}$ ($I_{Tx}^{Low}$: current for logical low Tx.) |

For different maximum data value $\delta$, there is a finite k that meets inequality $$1 \leq \frac{\delta}{\beta^k} < \beta (k \geq 0).$$

Each of the k+1 digits (with respect to base $\beta$) is marked as $R_m$ (m=k+1, k, . . . , 1). When the field value V (V$\in$[0,$\delta$]) follows a uniform distribution, the average number of pulses for one field (not including start pulses and end pulses), $N_{PPCP}$, can be computed as the following.

With $k=0, N_{PPCP}=2$.

With $k=1, N_{PPCP}=[2\beta+3(R_2-1)\beta+3(R_1+1)]/(\delta+1)$

With $k \geq 2, N_{PPCP}=[2\beta+(\beta-1)\Sigma_{n=2}^{k}(n-1)\beta^{n-1}+(k+2)$
$(R_{k+1}-1)\beta^k+(k+2)\Sigma_{n=2}^{k}R_n\beta^{n-1}+(k+2)$
$(R_1+1)]/(\beta+1)$   Equation 3

The average duration of PPCP, which is also the average transmission delay, $L_{PPCP}$ can be computed as following:

With $k = 0$, $L_{PPCP} = \tau(R_1 + 1)(R_1 + 6)/[2(\beta + 1)] - B$   Equation 4

With $k = 1$, $L_{PPCP} =$ $$\tau \left[ \frac{1}{2}\beta^2 + \frac{5}{2}\beta + \frac{(R_2 - 1)(R_2 + 4)}{2}\beta + \frac{(R_2 - 1)(\beta + 5)}{2}\beta + \right.$$
$$\left. (R_2 + 2)(R_1 + 1) + \frac{(R_1 + 1)(R_1 + 6)}{2} \right] / (\beta + 1) - B$$

-continued

With $k \geq 2$, $$L_{PPCP} = \tau \left\{ \frac{k}{2}\beta^{k+1} + \frac{3k+2}{2}\beta^k - \sum_{n=1}^{k-1} 2\beta^n + (R_{k+1}-1) \right.$$

$$\left( \frac{R_{k+1}+4}{2}\beta^k + \frac{k}{2}\beta^{k+1} + \frac{3k+2}{2}\beta^k \right) +$$

$$\sum_{m=2}^{k+1} \left[ (R_m+2)\left(1 + \sum_{n=1}^{m-1} R_n\beta^{n-1}\right) \right] +$$

$$\sum_{n=2}^{k} \left[ \frac{R_n+3}{2}R_n\beta^{n-1} + R_n\left(\frac{n-1}{2}\beta^n + \frac{3n-1}{2}\beta^{n-1}\right) \right] +$$

$$\left. \frac{(R_1+1)(R_1+6)}{2} \right\} / (\beta+1) - B$$

Based on the above equations, the average energy expenditure for transmitting a PPCP PDU, $E_{PPCP}$, can be deduced to:

$$E_{PPCP} = N_{PPCP} B P_{Tx}^{High} + (L_{PPCP} - N_{PPCP} B) P_{Tx}^{Low} \quad \text{Equation 5}$$

For a given transceiver hardware with power model parameters $P_{Tx}^{High}$ and $P_{Tx}^{Low}$ and pulse duration B, the optimal FBDS base ($\beta$) that can minimize the average energy ($E_{PPCP}$) can be found from equation 5.

According to equations 3 and 4, a relatively large base value ($\beta$) leads to a long length of the signal and an increased energy consumption on receiving and idle listening. A relatively small base value ($\beta$) narrows down the average length of signal, but may increase the average number of pulses/bits per data and bring about more energy consumption on transmitting. Therefore, there is an optimal base which can achieve the minimum total energy consumption on transmitting and receiving for any specific mote mode and any specific maximum data value ($\delta$).

As an example, consider a Mica mote and a maximum data value of 255 (i.e., $\delta=225$). The data part energy consumption in the form of PPCP in a point-to-point network may be calculated through, for example, equations 3 and 5. The power consumption of the Mica mote in the receiving, transmitting, and sleep modes are 14.4 mw, 36 mw, and 15 µw, respectively. FIG. 9 shows PPCP data part energy consumption with the different base values ($\beta$). It can be seen that the minimum PPCP-DSM format data part energy economy may be obtained when $\beta=6$. Accordingly, the optimal base is determined for each WSN based on the type of WSN and the maximum data value transmitted. As an example, FIG. 10 is a table that provides the optimal base value ($\beta$) for different motes and different maximum data values ($\delta$).

A PPCP protocol stack is configured to support control information such as header and trailer containing, for example, signal type (i.e., signal identifier), node identifiers, sequence numbers, cyclic redundancy check (CRC), etc. An arbitrary number of fields is included within a PDU using pre-agreed inter-field delimiters. For example, with reference to FIG. 11, an example multi-field PDU includes: number of fields (F), transmitter identification (Tx. Id), type indicator, and two data fields for transmitting data value (e.g., $\delta_1=161$ and $\delta_2=723$).

Figure 11:
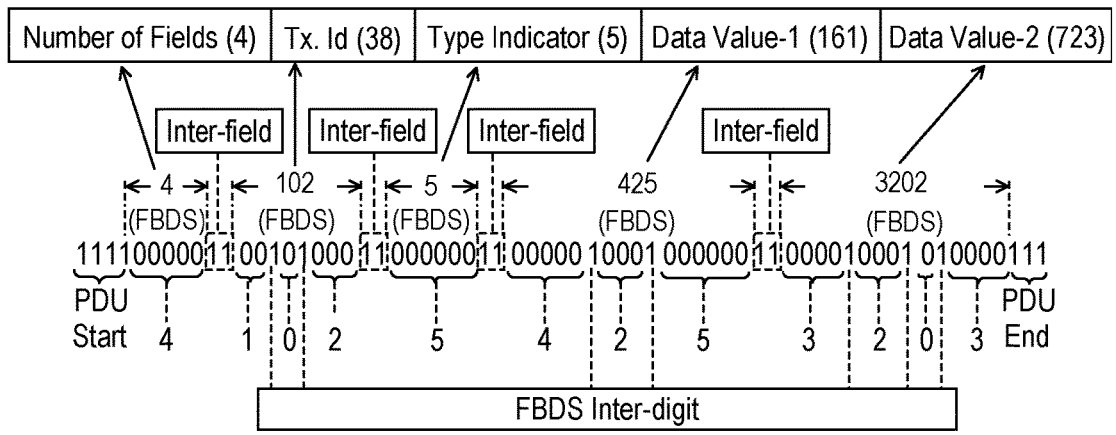
FIG. 11 is an example of a multi-field PPCP with FBDS compression.

The top part of FIG. 11 shows the values of different fields and the corresponding base-6 FBDS digits. The number of fields (F) represents the number of fields inside the PDU excluding F itself. In the example, the transmitter identification (Tx. Id.) is 38 and is converted to base-6 FBDS of 1,0, and 2. The type indicator indicates the type of the PDU. In the diagram, PPCP pulses are represented by the "1s" and the silence durations are represented by "0s." The following markers or delimiters are used: "1111" for PDU start, "111" for PDU end, "1" for inter-digit separation, and "11" as inter-field separation. It should be readily understood that the delimiters can be configured in various suitable ways and should not be limited to the examples provided here. It should be noted that an FBDS digit 'n' is represented by a silence of 'n+1' pulse durations. For example, the first FBDS digit 1 in the transmitter identification is represented by two 0's; a silence of two pulse durations. Accordingly, the coding of the value '0' would be a silence of one pulse duration.

Channel errors may affect PPCP's operation when different delimiters (i.e., PDU-start, PDU-end, inter-FBDS, and inter-field) are distorted due to pulse losses or false pulse detection. Unlike packets, in PPCP such errors in many situations can be detected from the framing context. For example, in FIG. 11 the sequence number is "00000 10001000000," where the 1s represent pulses and 0s represent silence. In a loss situation, the pulse indicated by the underlined 1 is lost, resulting in the sequence: "0000000001000000," and a 0 replaces the 1. With a FBDS base of 6, which is known by the receiver, an FBDS digit cannot be larger than 6; meaning there can never be a contiguous silence period longer than 6 pulse durations. But, in this case, the pulse loss created a contiguous silence of nine pulse durations (i.e., nine zeros) and, therefore, the receiver may detect that a pulse loss error has occurred.

For a given delimiter set, a comprehensive set of error detection rules can be developed for detecting possible errors based on such framing context. For example, for the default PPCP design shown in FIG. 11, which uses FBDS with base-6, if a received signal does not conform to the following set of formatting rules, an error can be detected: 1) start symbol should include four consecutive pulses; 2) trailer should have three consecutive pulses; 3) digit range of each received digit should have a range of $d_i \in [0, 5]$; 4) each field should be within the maximum pre-defined value for the respective field; 5) the number of received fields should be equal to F.

In addition to data loss, PPCP may be susceptible to pulse shift. A pulse shift may occur due to mismatch of clocks between a transmitter and a receiver, and to variations in the received analog signal shape, and the subsequent conversion to a digital pulse. To accommodate possible pulse shifts, a pulse slot may be for PPCP transmissions may be configured using the following method.

A node transmits a pulse at the start of a pulse slot of duration $\tau$. The transmitter sends the next pulse only after the pulse slot duration has passed so that only one pulse's rising edge appears within a pulse slot duration at the receiver, even if the pulse is shifted. Since pulse shifts can be variable, $\tau$ needs to be dimensioned such that a receiver unambiguously retrieves the correct number of silence durations between the start and end pulses encompassing the data value $\delta_i$ ($\delta_i = n-1$), where n is the number of silence durations. Note that once each pulse appears at the same position of a slot (e.g., in the middle or at the end of a slot), the receiver can still detect n correctly.

Figure 12A:
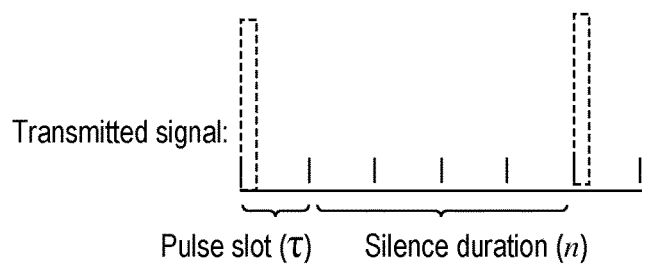
FIGS. 12A and 12B are diagrammatic views illustrating pulse slot duration.
Figure 12B:
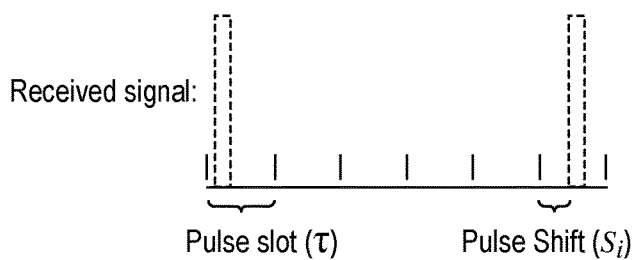

FIGS. 12A and 12B illustrate an example in which the data value ($\delta$) to be sent is 3, which is shown with 4 units of silence pulse durations between the start and end pulse. $S_i$ refers to the pulse shift with range $[S_{min}, S_{max}]$, which depends on, for example, the hardware characteristics including transceiver operating range, supply voltage, detection voltage threshold and can be computed experimentally for a target transceiver. In absence of any shift, or if $S_{max} \ll B$, where B is raw bit duration, a pulse slot is chosen equal to the pulse width (i.e., $\tau=B$). In the presence of pulse shift, however, $\tau$ needs to be larger than B.

The temporal separation between the rising edges of start and end pulses of a PPCP depends on the range of pulse shifts and where the pulses are received within a defined pulse slot. $D_{max}^n$ and $D_{min}^n$ define the maximum and minimum of such separations for n ($0 \leq n \leq \beta$), respectively, and can be expressed as:

$$\begin{cases} D_{max}^n = (n+1)\tau + S_{max} - S_{min} \\ D_{min}^n = (n+1)\tau - S_{max} + S_{min} \end{cases}$$

To distinguish n silence durations from (n+1) silence durations, a pulse slot duration $\tau$ is selected for transmitter and receiver such that the following is met $D_{min}^n < D_{max}^n < D_{min}^{n+1} < D_{max}^{n+1}$. Consequently, the width of the pulse slot can be selected as $\tau > 2(S_{max} - S_{min})$. Using such relationship between $\tau$, $S_{max}$, and $S_{min}$, the receiver distinguishes the number of silence pulse durations (n) and, thus, the value n−1 unambiguously, irrespective of how the pulse shifts alter the arrival time of the start and end pulses encompassing n.

Most WSNs are provided as multi-access networks in which multiple sensor devices are in communication with each other. For example, while a first sensor device transmits a data packet intended for a second sensor device, other sensor devices within the WSN may also receive the same data packet. To avoid such situations, the signal generating module 308 utilizes a multi-access point protocol described herein for PPCP transmission and may be referred to as a multi-access point PPCP protocol.

Inefficient communication between sensor devices may be caused by: idle listening, overhearing, control overhead, and collision. During idle listening, a subject node keeps the transceiver ON in a receiving mode because the node does not know when data is coming. However, since there is relatively low data exchange in WSNs, nodes may spend 50%-99% of the ON time doing nothing.

In overhearing, since nodes in radio transmission range share the same medium, a subject node may receive a signal that is not intended for it. Based on the WSN, the subject node can turn off the transceiver to save energy and go through an adaptive listening or go to sleep until the next scheduled listen time in order to save energy.

Conventional packet paradigm can be energy-inefficient due to the large overhead required for the data packet. For example, a typical data packet may require communication, processing, and buffering overheads that result in a large number of bits within the payload, header, and preamble for synchronization. Collision occurs when a subject node receives two or more packets at the same time. In particular, the subject node may have to discharge a corrupted packet and transmit a signal to the transmitting node to request the data packet again. Accordingly, the increase in transmission can increase energy consumption.

In the multi-access point PPCP protocol, periodic listen and sleep is used to avoid energy consumption due to idle listening and overhearing. In periodic listening, the listen interval is divided into two parts: synchronization (SYNC) and request to send (RTS). Each part is further divided into different numbers of time slots for senders to perform carrier sensing.

During SYNC, the nodes communicate with each other to synchronize the time at which each node may be transmitting data. While SYNC is generally known in the industry but, by way of review, before the subject node goes through periodic listen and sleep cycles, the node generates and maintains a schedule table that includes the schedules of all its known neighbor nodes. The schedule table is stored in the storage unit 306 of the communication controller 204.

To establish a schedule, the subject node listens for a certain period of time. If no signals are received, the subject node selects a schedule and transmits a SYNC signal that contains the subject node's identification and the time of the next sleep. If a node receives a SYNC signal from another node during the listening process, the subject node follows the received schedule instead of selecting its own schedule, and then waits for random delay to broadcast this schedule with its node ID.

The initial listen period in which the synchronization is performed for the first time may be longer than a normal listening period (e.g., tens of times longer than a normal listening period) and is mainly provided for the synchronization of all of the nodes so that the nodes follow the same schedule. After the initial synchronization, nodes also periodically retransmit their SYNC to eliminate the effect of clock drift due to the hardware being turned ON and OFF. If the subject node has a schedule and receives a SYNC signal with a different schedule from another node, the subject node adopts both schedules. Nodes may also occasionally listen for a complete frame to have new nodes adapt to the WSN. The described synchronization scheme, which is referred to as virtual clustering, urges nodes to form clusters with the same schedule, without enforcing this schedule to all nodes in the network.

In the example embodiment, the MAC and physical layer (PHY) specifications defined under IEEE 802.11 protocols are utilized to design the PPCP protocol. Under the PPCP protocol, nodes may transmit: a SYNC signal, an RTS signal, a clear to send (CTS) signal, a data cluster signal, or an end of transmission (EOT) signal. As discussed above, the SYNC signal is used to synchronize the nodes.

The RTS and CTS signals serve as a data transmission handshake between a transmitter node and a receiver node, where the receiver node is the intended recipient of the data packet. Specifically, the transmitter node transmits the RTS signal to an intended receiver node and the intended receiver node, in return, transmits the CTS signal to the transmitter node. After receiving the CTS signal, the transmitter node transmits the cluster signal. The cluster signal includes data, such as a data value detected by a sensor. After receiving the cluster signal, the receiver node transmits the EOT signal to notify the transmitter node and the other nodes that the transmission is complete and that the communication link is clear.

All nodes compete for a channel by performing carrier sense before initiating a transmission. If a node fails to capture the medium, it goes to sleep and wakes up when the receiver is free and listening again. Data unicast follows the handshake procedure and the 802.11 data transmission standard.

Energy consumption depends on the number of pulses/bits and the lengths of the signals (i.e., signals SYNC, RTS, CTS, data cluster, and EOT). At the same time, the lengths of the SYNC and RTS signals determine the duration of the listen period, which constitutes most of the idle listening energy consumption. Therefore, an optimal base value ($\beta_{t,d}$) for FBDS should be chosen in order to guarantee that the SYNC and RTS signals have minimal average length and minimal idle listening consumption.

On the other hand, the data packet of the cluster signal does not involve a listen period and, therefore, the optimal base value for data is based on equation 9 and possibly the table shown in FIG. 10 in order to achieve minimal transmitting and receiving energy consumption. If a node has multiple data waiting for transmission, it may utilize the interleaving encoding process to encode all the data within one cluster signal to save the control signal cost.

The data packet pattern for each of the signals SYNC, RTS, CTS, data cluster, and EOT has a unique design. As an example, FIG. 13 illustrates a data packet pattern for each of the signals. Each signal pattern includes a unique signal identifier, an end marker, and a data message. The unique signal identifier includes two pulses and may include an inter-pulse silence. The inter-pulse silence indicates the type of signal being transmitted. For example, no silence, one silence period, two silence periods, three silence periods, and four silence periods represents SYNC, RTS, CTS, data cluster, and EOT signals, respectively. Other combinations of pulses and silence periods may be used to identify different signals, and should not be limited to the examples provided herein.

After the signal identifier, each of the signals includes an identification of the transmitter node that has initiated communication. The transmitter node's identification may be referred to as a transmitter ID. The transmitter ID is transmitted as an inter-pulse silence period using the PPCP form, such that the silence period is transmitted between the signal identifier and the end marker for the node identification. In the example, two consecutive pulses are delimiters used to mark the end of the node identification. Alternatively, the end marker for the node identification can be any number of pulses and/or combinations of pulses and inter-pulse silences, and is not limited to the example provided herein.

The SYNC signal also includes a relative sleep time, as a data message. The relative sleep time may be transmitted as an inter-pulse silence between the end marker of the transmitter ID and the end marker of the data packet.

The RTS signal identifies the node to receive the data cluster from the transmitter node. In particular, the RTS signal includes an identification of the receiver node, which is referred to as the receiver ID. The identification used for identifying a given node may be a preassigned numerical value, an identification related to the transceiver 310 of the communication controller 204, and/or any other suitable data. The receiver ID is transmitted as an inter-pulse silence between the end marker of the transmitter ID and the end marker of the data packet.

In the example embodiment, the data cluster signal includes the data value provided by the sensor 202. The data value is transmitted using the PPCP form including interleaving and FBDS with an inter-pulse silence transmitted between the end marker of the transmitter ID and the end maker of the data packet. If multiple data values are transmitted, the data values are separated by a data divider or delimiter, such as two consecutive pulses.

The end marker for the data packet of the SYNC, RTS, CTS, and EOT signals is provided as two consecutive pulses. The end marker for the data cluster signal is provided as three consecutive pulses. The end markers for the signal may also be referred to as a completion marker. While specific examples are provided for the signal identifiers and the end markers, other numbers of pulses and/or pulses with inter-pulse silence may be used.

Figure 14:
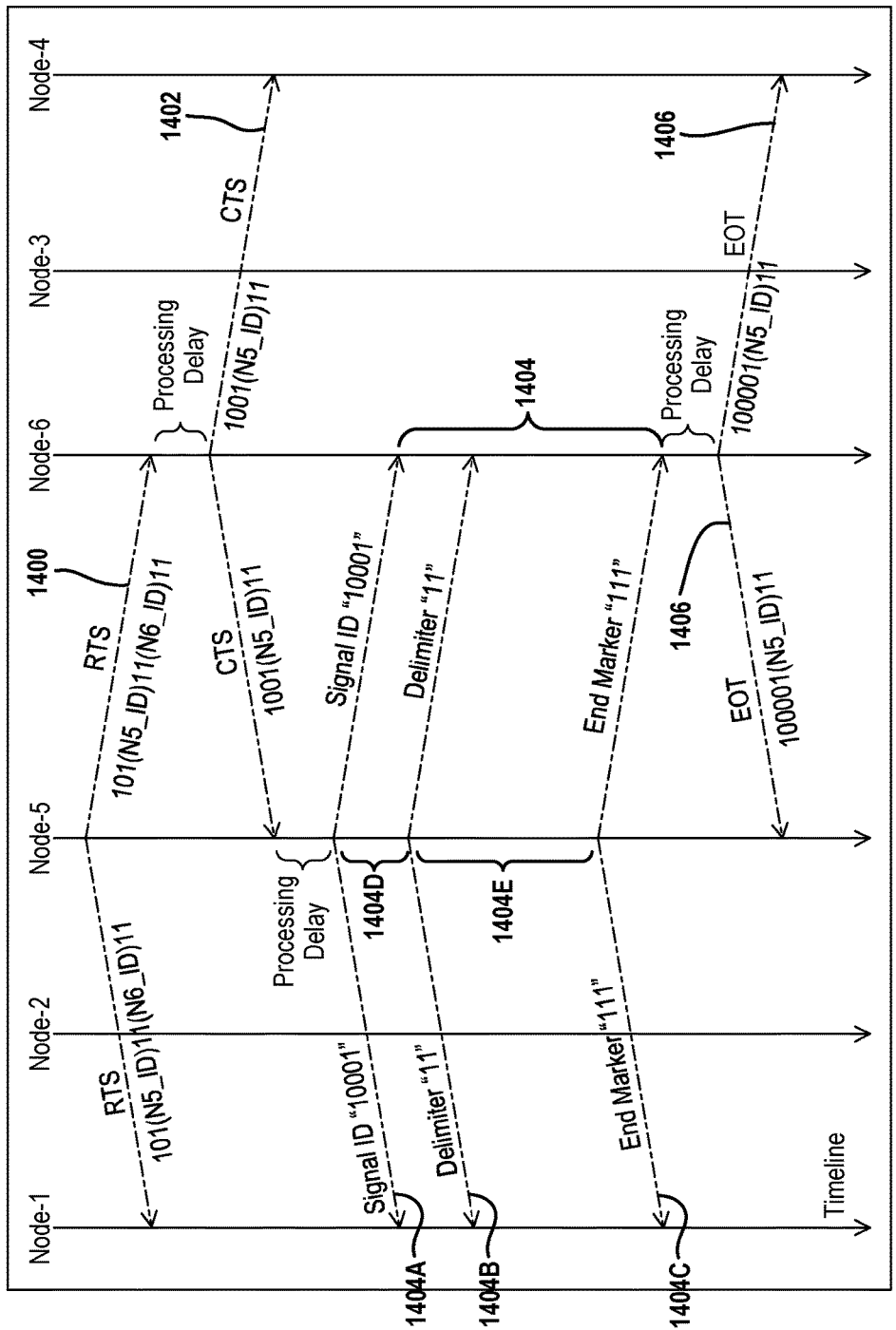
FIG. 14 is a diagrammatic view illustrating an example of a time schedule chart based on the multi-access point PPCP protocol.

With reference to FIG. 14, an example of multi-access communication using the PPCP protocol above is presented. As illustrated, Nodes 1-6 communicate as part of a WSN in which Node 5 is a transmitter node which transmits data to a Node 6, a receiver node. To communicate with Node 6, Node 5 transmits an RTS signal 1400 that includes a signal identifier, Node 5's identification as the transmitter ID (i.e., N5_ID in FIG. 14), Node 6's identification as the receiver ID (i.e., N6_ID), and an end marker for the data packet. The transmitter ID and the receiver ID are separated by delimiters provided as two pulses (i.e., 11). Although not illustrated, the transmitter ID is transmitted as a silence interval between the signal identifier and the divider pulse and the receiver ID is transmitted as a silence interval between the divider pulse and the end marker (i.e., "11").

The RTS signal 1400 is received by Node 6 and neighbor Nodes 1 and 2. Based on the signal received, Node 6 recognizes that the signal is an RTS signal and that Node 5 intends to send data to Node 6. When Nodes 1 and 2 receive the RTS signal 1400 from Node 5, the nodes recognize that Node 5 does not intend to communicate with them and, therefore, they become passive receivers.

After receiving the RTS signal 1400, Node 6 transmits a CTS signal 1402 that includes a signal identifier, Node 5's identification as the transmitter, and an end marker for the data packet. While not shown, the transmitter ID is transmitted as a silence interval provided between the signal identifier and the end marker. The CTS signal 1402 is received by Node 5 and neighbor Nodes 3 and 4. When Node 5 receives the signal, Node 5 recognizes the signal as a CTS signal based on the signal identifier and determines that it is clear to send data to Node 6. Thus, Node 5 communicates with Node 6 via a captured channel. When Nodes 3 and 4 receive the CTS signal 1402, the nodes recognize that the signal is a CTS signal intended for Node 5 and, therefore, they become passive receivers.

Using the captured channel, Node 5 transmits a data cluster signal 1404 that includes transmissions 1404A-C. Transmission 1404A includes the signal identifier for the data cluster signal (i.e., Signal ID "10001"). Between transmissions 1404A and 1404B is a silence interval 1404D indicative of the transmitter ID. Transmission 1404B includes a delimiter (i.e., "11"), and between transmissions 1404B and 1404C is an interval 1404E in which data values are transmitted in PPCP form. In the event that FBDS is used, a pulse "1" is provided as the delimiter between digits. Transmission 1404C includes the end marker of the data cluster signal 1404 (i.e., "111"). In the example embodiment, the end marker of the data cluster signal 1404 is provided as "111" in order to distinguish between the delimiter "11". Accordingly, the receiver node is able to recognize the end of data cluster signal. While FIG. 14 only illustrates one data value being transmitted, multiple data values or digits may be transmitted after the transmission of the transmitter ID based on the interleaving and FBDS principles described herein.

Node 6 and the neighbor Nodes 1 and 2 receive the data cluster signal 1404. When Node 6 receives the cluster signal 1404 from Node 5, it recognizes the end marker of the cluster signal 604 and transmits an EOT signal 1406. The EOT signal 1406 includes a signal identifier and a transmitter ID for Node 5, which is provided as a silence interval. Node 6 may then retrieve the data values by decoding the data cluster signal.

The low energy consumption in the PPCP paradigm could be immensely useful in terms of applications where energy is at a premium, such as small battery-powered wireless sensor nodes, assuming that the delivery delay specifications are relaxed. The light-weight format of pulse signals and transmission mechanisms based on PPCP also provide a communication scheme amongst heterogeneous wireless sensor networks. Motes used in different WSNs are often built on different physical layers to serve specific types of applications, but they cannot directly communicate with each other. Communication across different WSNs requires substantial modification to the physical layers and loses the unique advantage of each network. However, the PPCP-based communication described herein provides a common modulation scheme and message format, which makes data exchanging among heterogeneous wireless sensor networks possible.

Figure 15A:
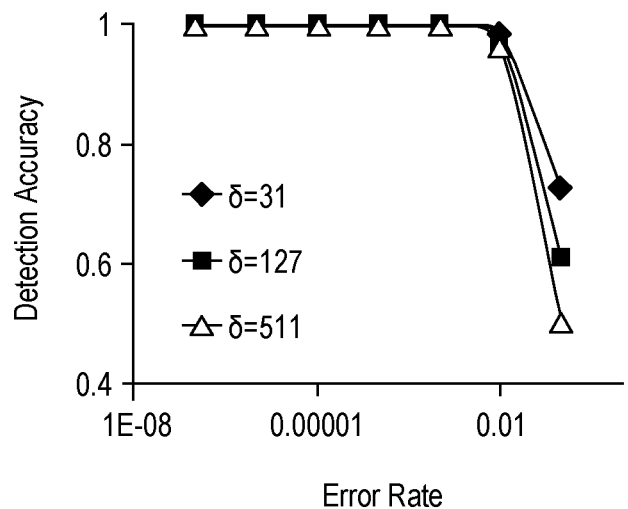
FIGS. 15A and 15B are graphs that show error rate and detection accuracy for PPCP signal with FBDS compression.
Figure 15B:
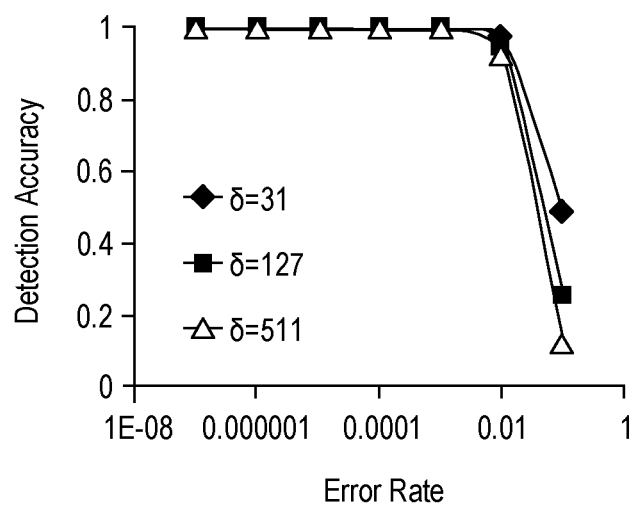

As described in detail above, the FBDS encoding process reduces the transmission time for a data value by representing the data value as multiple digits of a preset base system. By using FBDS, the WSN may easily detect errors due to pulse loss or false positive detections. For example, FIGS. 15A and 15B illustrate the error detection accuracy for a simulation of a multi-field PDU having three fields (F=3) and five fields (F=5). The x-axis shows the error probability, either pulse loss or false positive pulse detection, and the y-axis shows the detection accuracy using the method described herein, which does not rely on any link layer checksum.

Detection accuracy is defined as the number of correct PDUs delivered to the upper layer as a fraction of the ones received at the receiver. Using the PPCP format shown in FIG. 11, the type indicator is set to 0, because there is only one type of PDU sent to the access point (AP) or in other words, base station, in the transmit-only-network (ToN). Errors in FIGS. 15A and 15B are those due to pulse loss and false positives instead of those due to ALOHA collisions. Collisions are excluded by conducting the experiment on a point-to-point link.

The pulse loss rate (PLR) and false positive rate (FPR) vary in range from $10^{-7}$ to $10^{-1}$. It can be seen that for any value of F, the detection accuracy is close to 100% when the error rate is less than $10^{-1}$. That is true for all maximum data values ($\delta$=31, 127, and 511). Increasing $\delta$ to $10^{-1}$ leads to a reduction in detection accuracy. Also, for such high error rate, the detection accuracy is smaller for larger fields because the more fields means the longer PPCP with more data values that have a higher probability of getting corrupted.

To summarize, the internal pulse dependencies within the PPCP structure alone can be used for reasonable error detection without using a link layer checksum. This is especially true for low pulse loss and false positive detection rates. Note that an additional link layer checksum field can also be added just the same way it is done for packets.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for transmitting data by a subject sensor device in communication with one or more other sensor devices via a wireless network, the method comprising:

detecting, by a sensor of the subject sensor device, a parameter of an environmental condition;

outputting, by the sensor, at least two data values indicative of the parameter to a communication controller of the subject sensor device, wherein the communication controller includes a transceiver to communicate with the one or more other sensor devices via the wireless network;

constructing, by the communication controller, a data packet having a pair of unique pulse markers and a silence interval for representing each of the data values, wherein the silence interval is indicative of a given data value and is provided between the unique pulse markers for the given data value, one of the pair of unique pulse markers, as a start marker, is provided at a start of the silence interval for the given data value, and the other one of the pair of unique pulse markers, as an end marker, is provided at an end of the silence interval for the given data value;

transmitting, by the communication controller, the start markers for each of the data values separately to mark the start of the silence interval for each of the data values such that the start marker for at least one of the data values is interleaved within the silence interval for another data value; and transmitting, by the communication controller, after the silence interval for the given data value is complete, the end marker for the given data value to mark the end of the silence interval for the given data value.

2. The method of claim 1 further comprising including, for the unique pulse markers for each of the data values, at least two pulses that have a preset duration, wherein a duration of the silence interval for each of the data values is determined by $(\delta+1)K*T$ in which $\delta$ is the data value, K is a predetermined value that is equal to or greater than 1, and T is the preset duration of the pulse.

3. The method of claim 1 further comprising:

using, for the unique pulse markers for each of the data values, at least two pulses; and including, for the unique pulse markers, a different number of silence periods between the two pulses to distinguish between the data values.

4. A sensor device communicating in a wireless sensor network, the sensor device comprising:

a sensor operably monitoring a parameter of an environmental condition, wherein the sensor outputs a data value indicative of the parameter;

a communication controller including a processor and a transceiver, wherein the processor operates as:

a sensor input operably receiving the data value from the sensor;

a data encoder operably encoding the data value as a silence interval that is transmitted between at least two pulses; and a signal generator operably constructing a data packet for multiple types of signals and transmits each of the signals based on respective data packet and transmits the data packet via the transceiver;

the signal generator operably constructing a data cluster packet for a data cluster signal that is among the multiple types of signals;

the data cluster packet operably including the silence interval, a signal identifier, and a completion marker, wherein a start marker is provided at a start of the silence interval for a given data value and the completion marker is provided when the silence interval for the given data value is completed;

the signal identifier and the completion marker operably including at least one pulse having a preset duration; and the start marker and the completion marker indicating the silence interval being transmitted between the signal identifier and the completion marker, wherein the start marker for each data value separately marks the start of the silence interval for the given data value such that the start marker for the given data value is interleaved within the silence interval for another data value, and wherein the constructed data cluster packet is transmitted to a receiving device so that the receiving device can determine the preset duration of the silence interval.

5. The sensor device of claim 4 wherein the data encoder determines a duration of the silence interval based on equation $(\delta+1)K*T$ in which $\delta$ is the data value, K is a predetermined value that is equal to or greater than 1, and T is the preset duration of the pulse.

6. The sensor device of claim 4 wherein:

the data encoder determines the silence interval as a series of sub-silence intervals based on a digit separation encoder in which the data value is represented as one or more digits based on a predetermined base number system; and the data encoder separates the series of sub-silence intervals by a preset delimiter that has at least one pulse with the preset duration.

7. The sensor device of claim 4 wherein:

the data encoder encodes at least two data values from the sensor input;

each of the at least two data values is encoded as the silence interval and are provided between a pair of unique pulse markers between the silence interval for each of the data values;

one of the pair of unique pulse markers, as the start marker, is provided at the start of the silence interval for the given data value and the other one of the pair of unique pulses, as an end marker, is provided at the end of the silence interval for the given data value; and the data encoder interleaves the silence intervals of the at least two data values such that the start marker for the silence interval for a first data value is provided within the silence interval for a second data value, wherein the first data value and the second data value are among the at least two data values.

8. The sensor device of claim 4 further comprising a power source for powering the sensor and the communication controller.

9. The sensor device of claim 4 wherein:

the multiple types of signals supported by the signal generator includes a request-to-send signal, a clear-to-send signal, the data cluster signal, and an end of transmission signal; and the signal generator associates each of the multiple types of signal with a predefined signal pattern and each of the predefined signal pattern includes the signal identifier for identifying respective signal, the signal identifier includes at least two pulses and the two pulses of the signal identifier are separated by different number of silence of periods to identify different signals.

* * * * *